N. SVENVIG.
CASTER.
APPLICATION FILED JULY 19, 1909.

957,480.

Patented May 10, 1910.

WITNESSES:
D. E. Carlsen.
E. C. Carlsen.

INVENTOR:
Nikolai Svenvig
BY HIS ATTORNEY:
A. M. Carlsen

UNITED STATES PATENT OFFICE.

NIKOLAI SVENVIG, OF ST. PAUL, MINNESOTA, ASSIGNOR OF ONE-FOURTH TO WILLIAM T. KIRKE AND ONE-FOURTH TO JARVIS W. MASON, BOTH OF ST. PAUL, MINNESOTA.

CASTER.

957,480.  Specification of Letters Patent. Patented May 10, 1910.

Application filed July 19, 1909. Serial No. 508,514.

*To all whom it may concern:*

Be it known that I, NIKOLAI SVENVIG, a citizen of the United States, residing at St. Paul, in the county of Ramsey and State of Minnesota, have invented a new and useful Caster, of which the following is a specification.

My invention relates to casters of the kind used to support the legs of tables, chairs and other furniture and sometimes also for supporting trucks of various kinds.

The object is to provide a durable and efficient caster having a central support to the leg or other point to which it is secured, and a bearing surface large enough to not mark or injure the floor upon which the caster moves.

Figure 1:
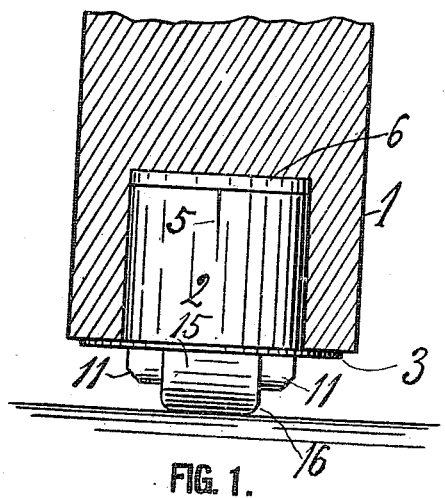
Figure 2:
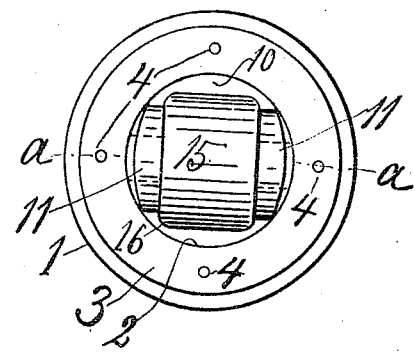
Figure 3:
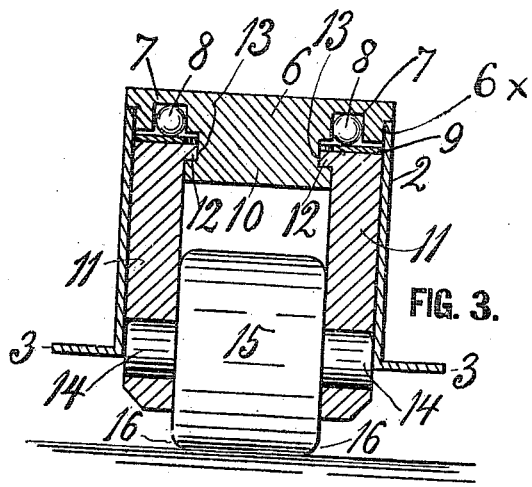
Figure 4:
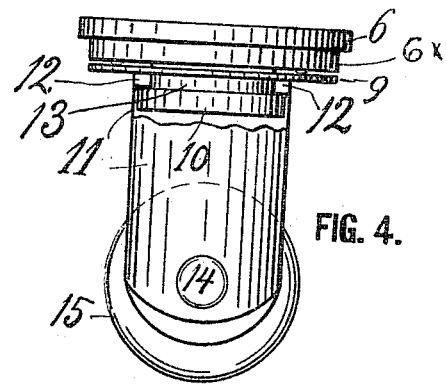
Figure 5:
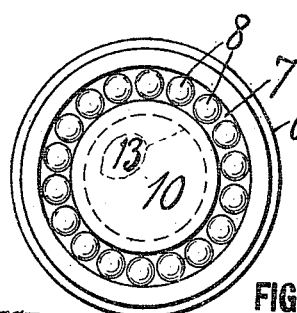
Figure 6:
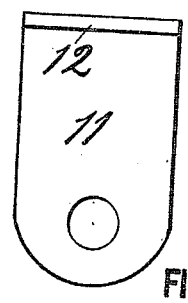
Figure 7:

In the accompanying drawing Figure 1 is a side elevation of my improved caster shown as inserted in a leg of a table, said leg being in diametrical section. Fig. 2 is a bottom end view of a table leg with my caster applied to it. Fig. 3 is a diametrical section of the caster only, as on the line *a—a* of Fig. 2. Fig. 4 is a side elevation of the caster with the frame shell of its mechanism removed and one of its journal bearings partly broken away. Fig. 5 is an inverted detail view of the ball-bearing forming the top end of the caster. Fig. 6 is an inner side view of one of the cheek pieces forming the bearings for the trunnions of the main supporting roller of the caster. Fig. 7 is a top end view of Fig. 6.

Referring to the drawing by reference numerals, 1 designates a leg or other part of a piece of furniture or other article provided with a suitable cavity in which the stem of the caster is to be tightly inserted. Said stem is made up of an external cylindrical shell or frame 2, having its lower end provided with a flange 3 in which are holes 4 for screws or nails to help secure the caster to the object it supports. The upper end of the shell is preferably provided with a few side slits, like 5 in Fig. 1 to permit the shell to widen slightly and act as a clasp about the reduced portion 6$^x$ of a plug or cover 6 which closes the upper end of the shell. In said cover is an annular groove 7 in which balls 8 are retained by a washer 9, which surrounds a central boss 10 depending from the cover and is held in touch with the balls by the upper ends of segmental cheek plates 11, which are provided each with a curved flange 12 engaging in an annular recess 13 of the boss 10, whereby is formed a ball bearing at the upper ends of the cheek plates 11, in whose lower ends are journaled the trunnions 14 of a roller 15 whose lower side rolls upon the floor and whose edges are rounded at 16 to prevent abrasive contact with floors or carpets thereon.

The shell fits so snugly over the cheek plates 11 as to hold them firmly against the boss 10 of the bottom piece, and as the latter is firmly embraced by the upper end of the shell, the structure is thereby held together as a complete article, ready to be applied as already described.

What I claim is:

1. A caster comprising a cylindrical shell adapted for insertion upward into an article to be supported, a cover closing the top of the shell and having a central downward boss with an annular recess about it, two oppositely disposed cheek plates fitted in the shell and having at their upper ends curved flanges by which to engage in the annular groove and their lower ends projected below the lower end of the shell and a supporting roller rotating about a horizontal axis and having its ends journaled in the cheek plates.

2. A caster comprising a cylindrical shell adapted for insertion upward into an article to be supported, a cover closing the top of the shell and having a central downward boss with an annular recess about it, two oppositely disposed cheek plates fitted in the shell and having at their upper ends curved flanges by which to engage in the annular groove and their lower ends projected below the lower end of the shell and a supporting roller rotating about a horizontal axis and having its ends journaled in the cheek plates, said shell having about its lower end an annular flange provided with holes for nails or screws for the purpose set forth.

3. A caster comprising a cylindrical shell adapted for insertion upward into an article to be supported, a cover closing the top of the shell and having a central downward boss with an annular recess about it, two oppositely disposed cheek plates fitted in the shell and having at their upper ends curved flanges by which to engage in the annular groove, and their lower ends projected below the lower end of the shell and a supporting roller rotating about a horizontal axis and having its ends journaled in the cheek plates, said bottom having at its under side an annular recess, balls in said recess, a washer supporting the balls and resting upon the upper ends of the cheek plates.

4. A caster comprising a cylindrical shell adapted for insertion upward into an article to be supported, a cover closing the top of the shell and having a central downward boss with an annular recess about it, two oppositely disposed cheek plates fitted in the shell and having at their upper ends curved flanges by which to engage in the annular groove and their lower ends projected below the lower end of the shell and a supporting roller rotating about a horizontal axis and having its ends journaled in the cheek plates, said shell having its upper end slit so as to clasp the cover and the cover having a reduced portion adapted to be forced into the clasping portion of the shell.

In testimony whereof I affix my signature, in presence of two witnesses.

NIKOLAI SVENVIG.

Witnesses:
 EMILY FOSS,
 W. T. KIRKE.